United States Patent [19]

Kanda

[11] Patent Number: 5,247,295
[45] Date of Patent: Sep. 21, 1993

[54] PULSE TRANSFER SYSTEM FOR MANUAL PULSE GENERATOR

[75] Inventor: Kunio Kanda, Gotenba, Japan
[73] Assignee: Fanuc Ltd., Minamitsuru, Japan
[21] Appl. No.: 720,844
[22] PCT Filed: Nov. 9, 1990
[86] PCT No.: PCT/JP90/01460
   § 371 Date: Jul. 15, 1991
   § 102(e) Date: Jul. 15, 1991
[87] PCT Pub. No.: WO91/08527
   PCT Pub. Date: Jun. 13, 1991

[30] Foreign Application Priority Data

Nov. 27, 1989 [JP] Japan ................................. 1-307097

[51] Int. Cl.$^5$ .............................................. H04Q 1/00
[52] U.S. Cl. ........................... 340/825.57; 340/825.69; 341/173; 364/136; 377/44
[58] Field of Search ...................... 340/825.57, 825.65, 340/825.69; 377/15, 16, 1, 44; 364/136, 167.01, 188, 190, 474.01, 474.1, 474.11, 474.22; 341/173, 176, 187

[56] References Cited

U.S. PATENT DOCUMENTS

| | | | |
|---|---|---|---|
| 4,004,137 | 1/1977 | Schroder | 377/44 |
| 4,519,026 | 5/1985 | Nozawa et al. | 364/188 |
| 4,628,442 | 12/1986 | Isobe et al. | 364/136 |

FOREIGN PATENT DOCUMENTS

| | | |
|---|---|---|
| 58-151608 | 9/1983 | Japan. |
| 59-94105 | 5/1984 | Japan. |
| 61-32108 | 2/1986 | Japan. |
| 61-161518 | 7/1986 | Japan. |
| 1-36305 | 2/1989 | Japan. |
| 1-125606 | 5/1989 | Japan. |

Primary Examiner—Donald J. Yusko
Assistant Examiner—Brian Zimmerman
Attorney, Agent, or Firm—Staas & Halsey

[57] ABSTRACT

A pulse transfer system is provided by which a pulse signal output from a manual pulse generator unit is transferred to a numerical control apparatus through a wireless channel. Pulses are generated in accordance with the rotation of a knob of the manual pulse generator and are counted from a reference time by a counter. A numerical value of the counter is modulated by a modulation circuit, amplified by a power amplifier circuit, and transferred as a coded signal from an antenna to a numerical control apparatus at each predetermined time. The numerical control apparatus receives the coded signal through the wireless channel and recognizes the pulses from the manual pulse generator. The coded signal transferred from the manual pulse generator unit through the wireless channel is a signal as an absolute position using time as a reference, and thus even if an error occurs during the transfer, the correct number of pulses can be recognized.

5 Claims, 4 Drawing Sheets

PULSE TRANSFER SYSTEM FOR MANUAL PULSE GENERATOR

BACKGROUND OF THE INVENTION

1. Technical Field

The present invention relates to a pulse transfer system for a manual pulse generator, and more specifically, to a pulse transfer system for a manual pulse generator by which the reliability of wireless data communication is greatly improved.

2. Background Art

Since a manual pulse generator for a numerical control apparatus is connected to the main body thereof, a cable having a plurality of circuits is needed, and further, the cable must be moved as the operator operating the manual pulse generator moves. Namely, since the cable must be moved, the operation efficiency is greatly lowered.

To solve the above problem, the inventor proposed a wireless manual pulse generator in Japanese Patent Application No. Hei 1-286737.

In this application, a numerical control apparatus monitors an output pulse signal transferred by a manual pulse generator unit, at all times, and notifies the manual pulse generator unit of the receiving state thereof. More specifically, when the output pulse signal is normally received, a normal reception signal is returned to the manual pulse generator unit, and when the signal is not received, a not received signal is returned thereto. When the numerical control apparatus cannot confirm that transferred data has been normally received, the manual pulse generator unit retransfers the data, and when the number of times that the transferring/receiving data is not received exceeds a predetermined limit, the transferring/receiving of the data is interrupted.

With this arrangement, the transfer/receiving state of data is strictly checked, to thereby improve the reliability of the transferring/receiving of data.

Nevertheless, in the conventional pulse transfer system for the manual pulse generator, since the emphasis is placed on a confirmation of whether data is correctly transferred from the manual pulse generator unit and correctly received by the numerical control apparatus, the transfer/receiving system becomes complex and the handling thereof is time-consuming.

SUMMARY OF THE INVENTION

Taking the above into consideration, an object of the present invention is to provide a simple wireless type pulse transfer system for a manual pulse generator unit by which the same reliability as that obtained when a conventional cable is used, is ensured.

To solve the above problem, according to the present invention, there is provided a pulse transfer system for a manual pulse generator by which a pulse signal output from a manual pulse generator unit is transferred to a numerical control apparatus through a wireless channel, which comprises a counter disposed in the manual pulse generator unit for counting pulses generated in accordance with the rotation of the manual pulse generator from a reference time, a signal transfer means for transferring a numerical value of the counter to the numerical control apparatus as a coded signal, at each predetermined time, through the wireless channel, and a signal receiving means disposed in the numerical control apparatus for receiving the coded signal through the wireless channel and counting the pulses of the manual pulse generator.

The coded signal transferred from the manual pulse generator unit through the wireless channel is a signal of an absolute position using a time as a reference, and a present position as the absolute position is transmitted as data to the numerical control apparatus at each predetermined time. The numerical control apparatus takes out data of the present position as the absolute position from an output pulse signal transferred from the manual pulse generator unit through the wireless channel.

BEST MODE OF CARRYING OUT THE INVENTION

An example of the present invention will be described below with reference to the drawings.

Figure 1:
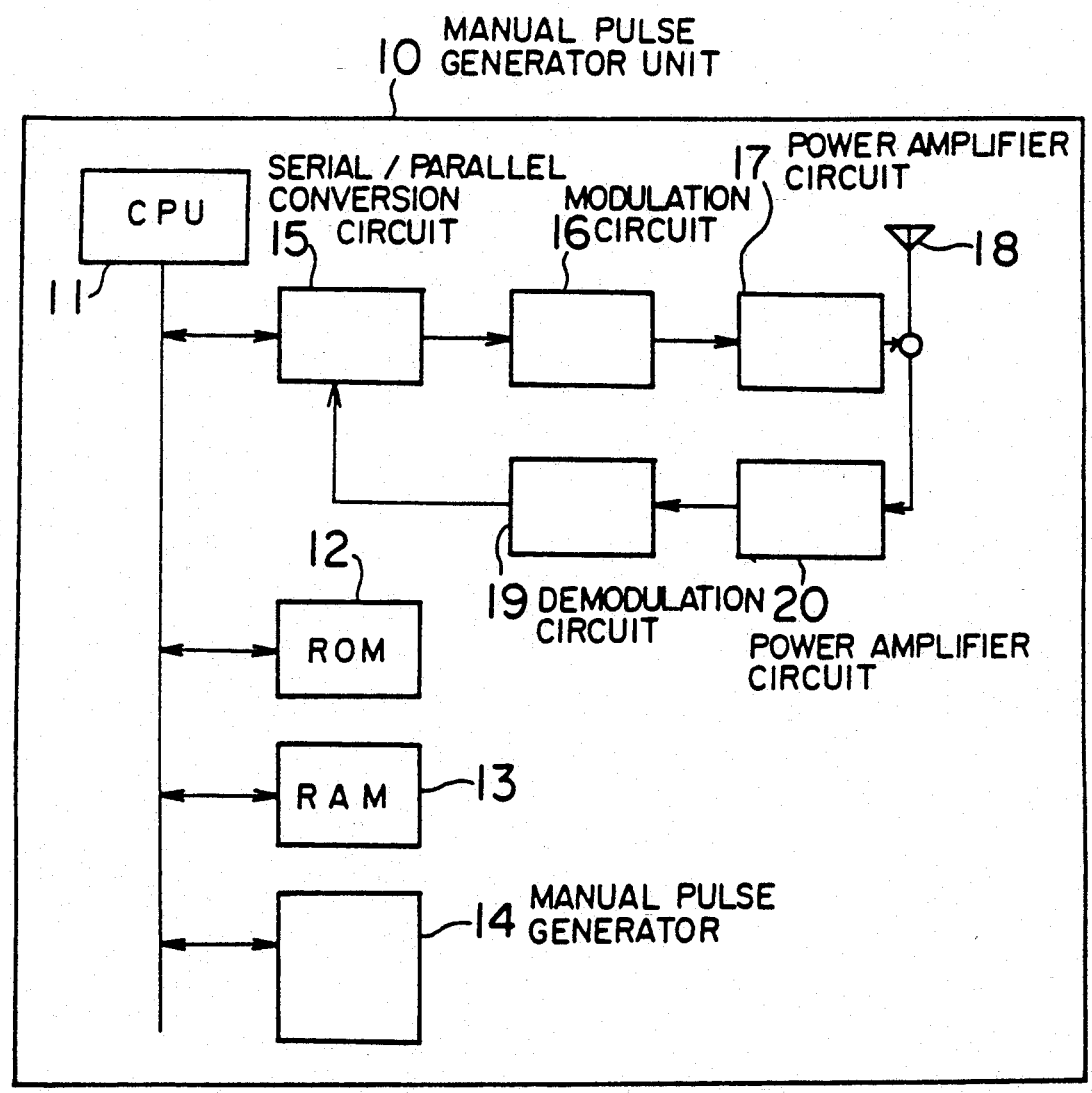
FIG. 1 is a block diagram of the hardware of a manual pulse generator unit embodying the present invention.

FIG. 1 is a block diagram of the hardware of a manual pulse generator unit embodying the present invention, wherein a processor 11, with a clock inherent therewith, controls a manual pulse generator unit 10 in accordance with a system program stored in a ROM 12. The ROM 12 is an EPROM or EEPROM. The RAM 13 is a SRAM in which transmitted signal data, received signal data, integrated signal data, and other various data are stored.

A manual pulse generator 14 generates pulses for moving the axes of a machine tool by a unit of 1 micrometer or 10 micrometers. A present position as an absolute position is determined in such a manner that 1 is incremented or decremented and counted each time a pulse is generated and detected, using a time (e.g., a time at which the manual pulse generator unit 14 operates) as a reference. The number of pulses detected and counted at each predetermined period of time is integrated under the control of the processor 11 and coded, and thus the present position as the absolute position is stored in the above RAM 13.

A serial/parallel conversion circuit 15 converts the pulse number code of the present position as the absolute position stored in the RAM 13, into a serial code, and the converted pulse number code is modulated (subjected to an FM modulation) by a modulation circuit 16, power amplified by a power amplifier circuit 17 at the next stage, and transmitted from an antenna 18 as an output pulse code (coded signal).

A power amplifier circuit 20 amplifies an electric wave received from the antenna 18, and including a confirmation signal from a numerical control apparatus 30 to be described below, and a demodulation circuit 19 demodulates the electric wave and takes out data from a carrier wave. This data is stored in the RAM 13 under the control of the processor 11.

Figure 2:
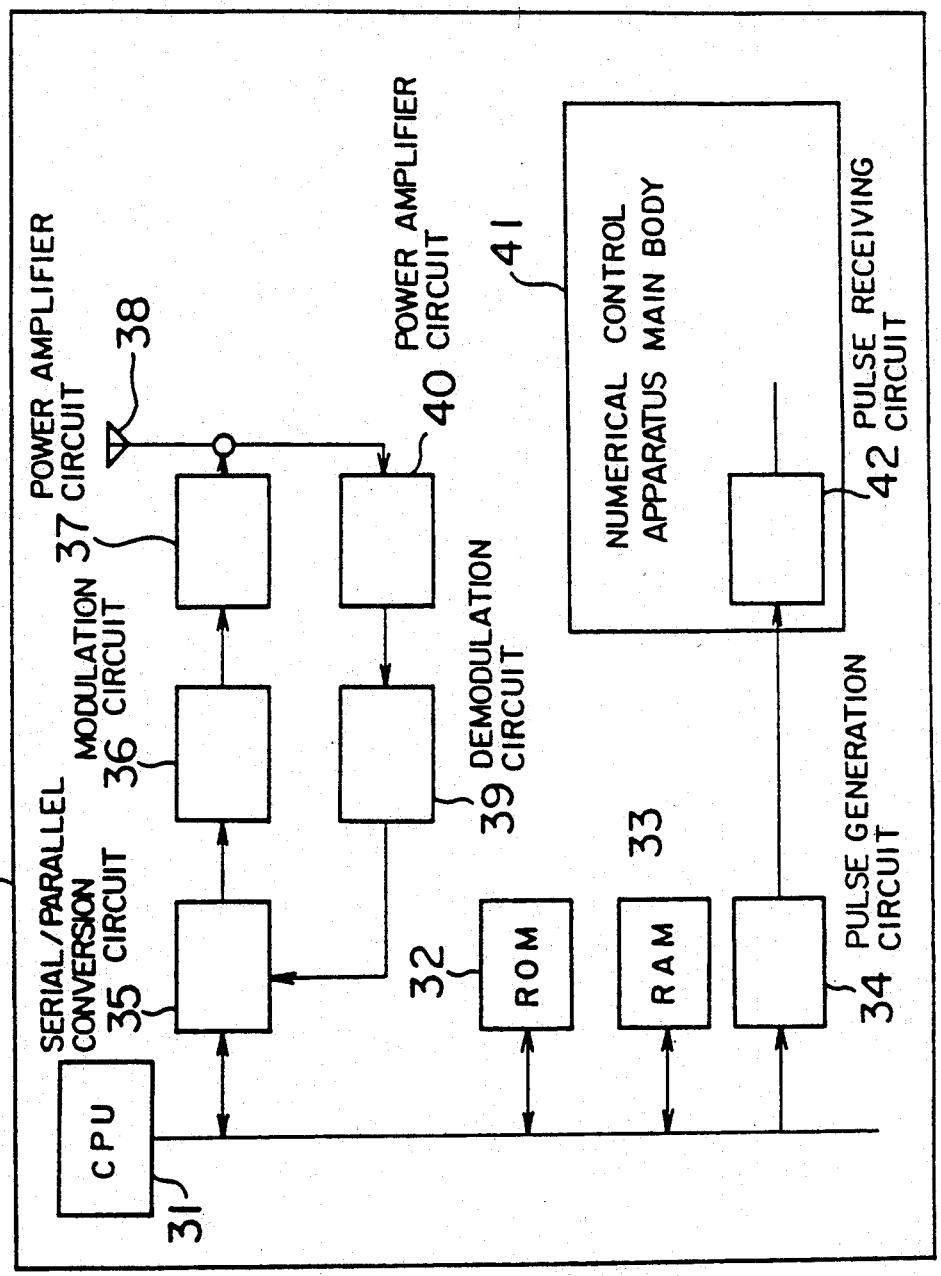
FIG. 2 is a block diagram of the hardware of a numerical control apparatus unit embodying the present invention.

FIG. 2 is a block diagram of the hardware of the numerical control apparatus embodying the present invention, wherein only the manual pulse generator unit 10 and the parts relating to the transferring and receiving of the output pulse signal are shown, and an axis control circuit, PMC and the like are not shown. In the figure, a processor 31 controls the output pulse signal and the like in accordance with a control program stored in a ROM 32, which is an EPROM or EEPROM. The RAM 33 is a SRAM in which transmitted signal data, received signal data, integrated signal data, and other various data are stored.

A serial/parallel conversion circuit 35 converts the confirmation signal and the like to a serial signal, and the serial signal is modulated (subjected to an FM modulation) by a modulation circuit 36, power amplified by a power amplifier circuit 37 at the next stage, and transmitted from an antenna 38.

A power amplifier circuit 40 amplifiers an electric wave received from the antenna 38, and including the output pulse signal transferred from the manual pulse generator unit 10, and a demodulation circuit 39 demodulates the electric wave and takes out data from a carrier wave. This data includes the number of pulses generated by the manual pulse generator 14, and is stored in the RAM 33 under the control of the processor 31. A pulse generation circuit 34 converts the data into pulses and counts same, and a pulse receiving circuit 42 in a numerical control apparatus main body 41 receives pulses from the pulse generation circuit 34.

When no error is detected in the data received by the numerical control apparatus 30, the apparatus 30 transmits a confirmation signal "ACK" notifying that the data has been normally received, and when an error is detected in the received data, the numerical control apparatus 30 transmits a receiving unable signal "NACK" notifying that an error has been detected.

Figure 3:
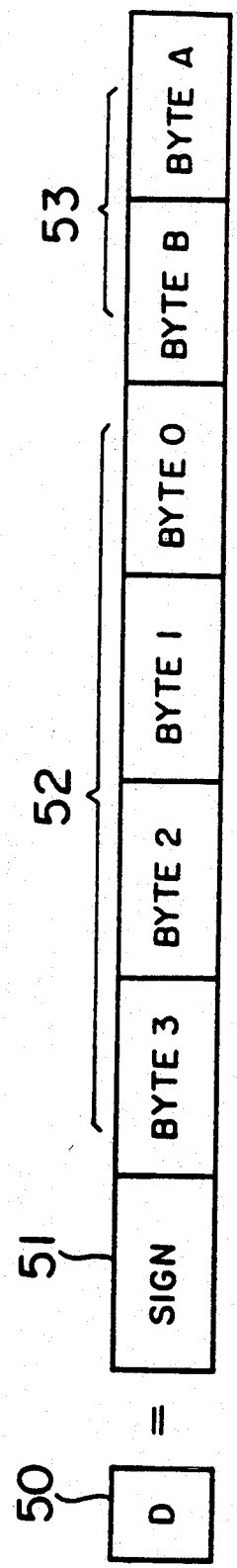
FIG. 3 is a diagram explaining the content of an output pulse signal transferred from a manual pulse generator unit in the present invention.

FIG. 3 is a diagram showing the arrangement of the output pulse signal transferred from the manual pulse generator unit 10 in the present invention. Designated at D 50 is the output pulse signal transferred from the manual pulse generator unit 10, and designated at SIGN 51 is a pulse symbol of a pulse signal which is positive when the manual pulse generator 14 is rotated to the right and negative when it is rotated to the left.

BYTE 3-BYTE 0 designated by 52 represent an integrated value of the number of pulses generated by the manual pulse generator 14 at each time, assuming that the absolute position at a certain time is "0". BYTE B and BYTE A designated by 53 are used to check errors in a transferred signal. A data check signal is included in the output pulse signal D from the manual pulse generator unit 10, to thereby eliminate errors. A cyclic redundancy check (CRC) system is employed as a check means.

Figure 4:
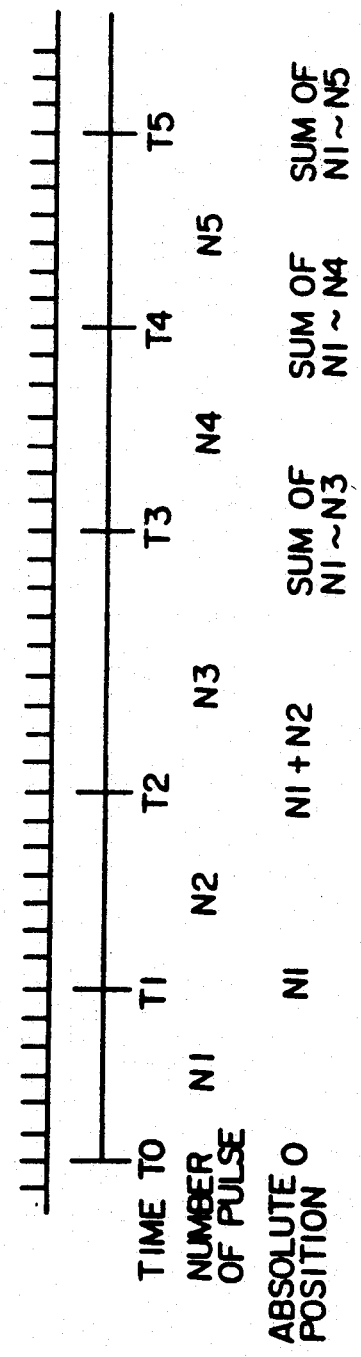
FIG. 4 is a time chart and a diagram explaining the relationship between the number of pulses.

FIG. 4 is a diagram showing time at which the manual pulse generator 14 operates, the number of pulses generated during that time, and an absolute position at the time at which the manual pulse generator 14 operates. Assuming that the absolute position at a time T0 is "0", the absolute position at a time T1 is "N1" obtained by detecting and counting pulses from the time T0 to the time T1. In the same way, the absolute position at a time T2 is "N1+N2", which is obtained by integrating the "N1", the counted and detected pulses from the time T0 to the time T1 and "N2", the counted and detected pulses from the time T1 to the time T2. Further, the absolute positions at times T3, T4, and T5 are "the sum of N1 to N3", "the sum of N1 to N4", and "the sum of N1 to N5", respectively.

As described above, the absolute position obtained by integrating the pulses generated from the manual pulse generator is transferred, and thus even if an error and the like occurs during the transfer, the error does not have an adverse effect, and thus the absolute position can be correctly transferred.

Figure 5:
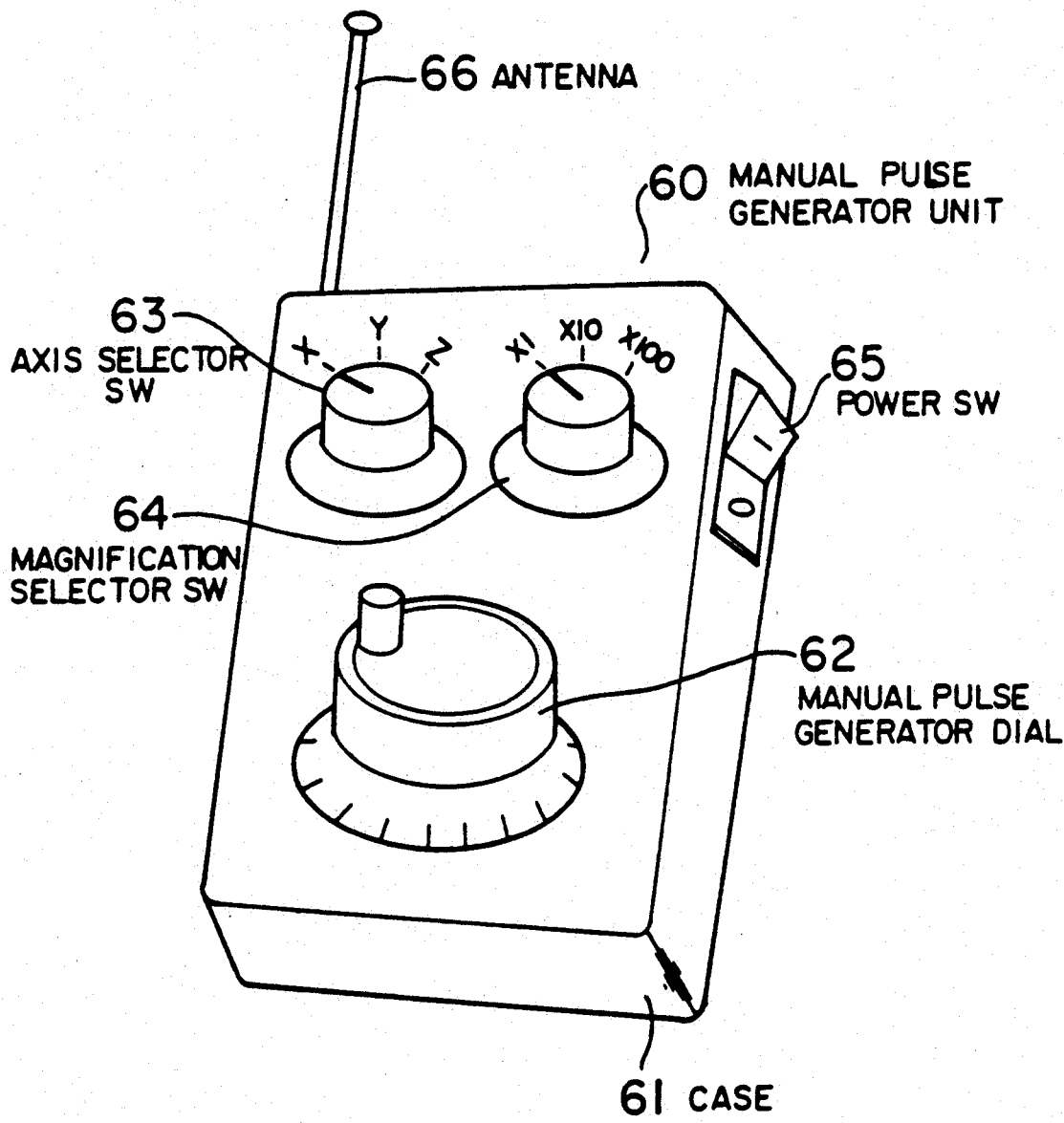
FIG. 5 is a perspective view of a manual pulses generator unit according to the present invention.

FIG. 5 shows an example of a perspective view of the manual pulse generator unit according to the present invention. In the figure, the case 61 of a manual pulse generator unit 60 includes a manual pulse generator dial 62, an axis selector switch 63 for selecting an X axis, Y axis, Z axis and the like, a magnification selector switch 64 for determining a magnification of a generated pulse, a power supply switch 65, and an antenna 66.

Note, although one set of the manual pulse generator unit and the numerical control apparatus is used in the above description, a plurality of sets of the manual pulse generator units and the numerical control apparatuses can of course search an unoccupied channel and establish an interconnection with each other.

Further, the wireless transfer system between the manual pulse generator unit 10 and the numerical control apparatus 30 employs a low power FM system, from the view point of the positional layout of each apparatus in a factory, various electrical and mechanical noise, and the workability of the operators.

As described above, according to the present invention, since the number of pulses generated by the manual pulse generator is counted using a time as a reference, a present position as the absolute position is coded at each predetermined time and transferred to the numerical control apparatus, the rotary pulses of the manual pulse generator can be received from received data when the data is normally received. As a result, even if a pulse signal is transferred through a wireless channel, it can be transferred as accurately as when transferred through a conventional cable.

I claim:

1. A pulse transfer system where an output pulse signal from a manual pulse generator unit can be transferred to a numerical control apparatus through a wireless channel, comprising:
    a manual pulse generator unit including
        a manual pulse generator control capable of generating pulses in response to manual operation thereof;
        a clock means for sequentially determining predetermined periods of time;
        counter means for counting the pulses generated during each of the predetermined periods of time to produce a numerical count value; and
        a signal transfer means for transferring the numerical count value for each of the predetermined periods of time to transmit a coded signal over the wireless channel; and
    a numerical controller apparatus including signal receiving means for receiving the coded signal from the wireless channel and for counting the pulses coded in said coded signal.

2. A pulse transfer system according to claim 1, wherein said signal transfer means for transferring includes means for supplementing the coded signal with a cyclic redundancy check signal as a data check signal based on a content of the numerical count.

3. A pulse transfer system according to claim 1, wherein said signal transfer means for transferring includes a low power FM transmitter for transmitting the coded signal on the wireless channel and said signal receiving means includes a low power FM receiver for receiving the coded signal from the wireless channel.

4. A pulse transfer system according to claim 1, wherein said signal receiving means of said numerical control apparatus and said signal transfer means of said manual pulse generator unit comprise means for searching a plurality of the wireless channels to select an unoccupied channel and establish an interconnection.

5. A pulse transfer system according to claim 1, wherein said manual pulse generator control comprises a manually rotatable knob.

* * * * *